United States Patent [19]
Helble

[11] Patent Number: 6,163,635
[45] Date of Patent: Dec. 19, 2000

[54] VALVE FOR LIGHT PIPE

[76] Inventor: Robert Helble, 1105 Edgewood Rd., Yardley, Pa. 19067

[21] Appl. No.: 09/316,252

[22] Filed: May 21, 1999

Related U.S. Application Data

[60] Provisional application No. 60/092,140, Jul. 9, 1998.

[51] Int. Cl.⁷ ..................................................... G02B 6/26

[52] U.S. Cl. ............................................. 385/19; 362/551

[58] Field of Search .................................. 385/15, 19, 24, 385/31, 147; 362/551; 359/619, 623; 372/45, 46, 50, 29; 606/11, 16, 19

[56] References Cited

U.S. PATENT DOCUMENTS

| | | | |
|---|---|---|---|
| Re. 31,806 | 1/1985 | Scifres et al. | 372/50 |
| 4,270,845 | 6/1981 | Takizawa et al. | 372/29 |
| 4,881,110 | 11/1989 | Braatz et al. | 257/449 |
| 5,396,304 | 3/1995 | Salerno et al. | 353/122 |

*Primary Examiner*—Akm E. Ullah
*Attorney, Agent, or Firm*—Daniel Kramer

[57] ABSTRACT

A valve for a light pipe having a rotatable platen having opaque and transparent parts, said valve including means for receiving and coaxially positioning a source end of a light pipe and a sink end of a light pipe and for alternately positioning the transparent and the opaque parts of the platen between the ends.

19 Claims, 2 Drawing Sheets

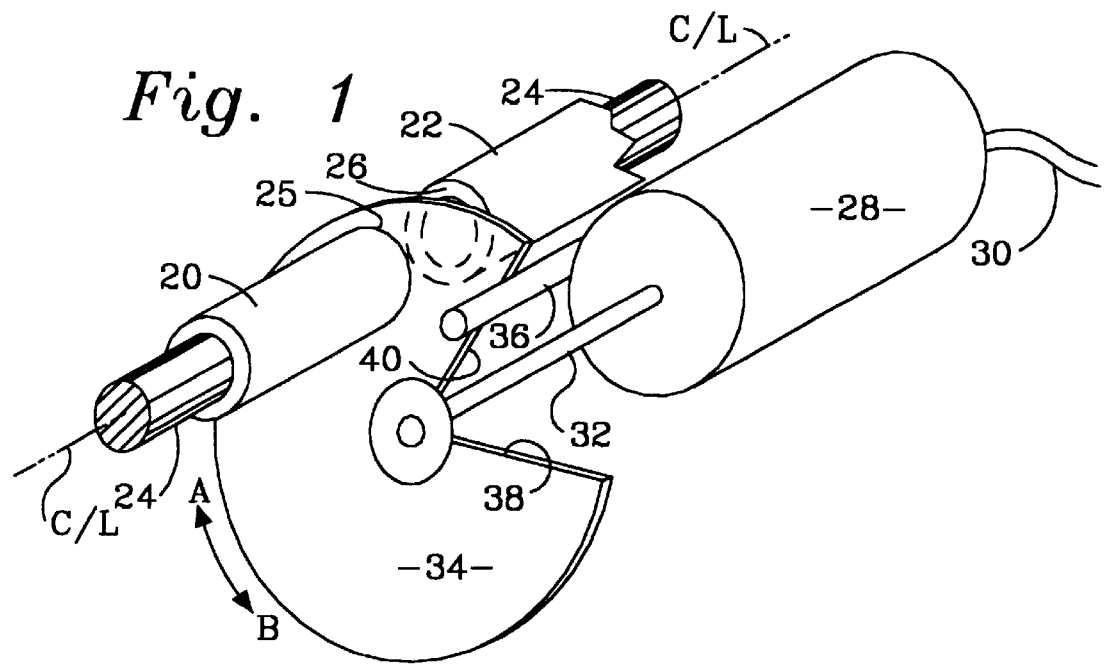
Fig. 1
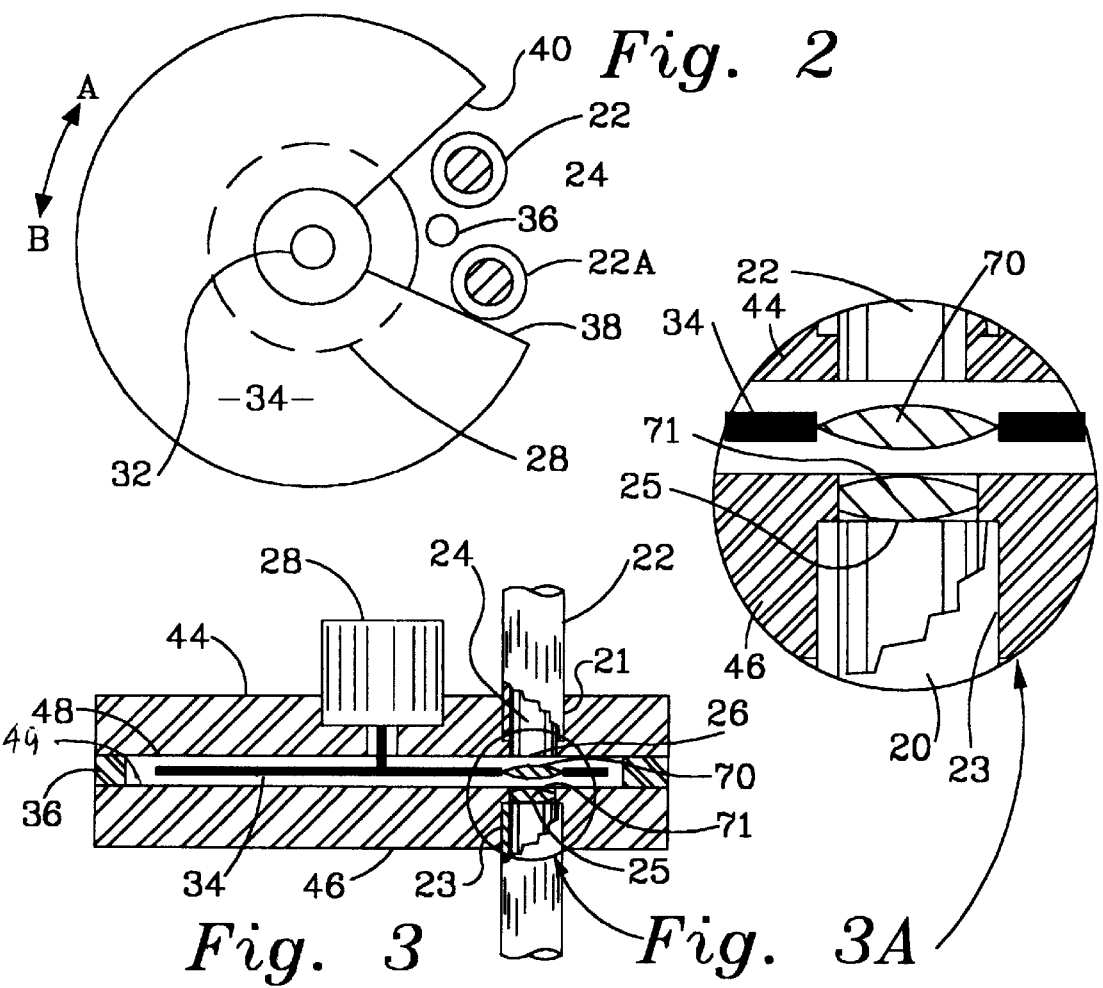
Fig. 2
Fig. 3
Fig. 3A

VALVE FOR LIGHT PIPE

BACKGROUND

Related Applications: Provisional Patent Application Ser. No. 60/092,140 filed Jul. 9, 1998 Titled: SWITCH FOR LIGHT PIPE

FIELD OF THE INVENTION

This invention is related to the field associated with the transmission and control of light through fiber-optical cables.

The field of the invention is more closely related to the field associated with such cables employing a single homogeneous light conductor enclosed in a flexible sheath. Such a light conductor/sheath combination will hereafter be referred to as a "light-pipe." The conductor may periodically be referred to as the core, with the understanding that the terms core and conductors are synonymous. The sheath may be opaque or translucent or transparent, depending on the intended application.

The field of the invention is closely related to the field pertaining to techniques and technologies for allowing and preventing the flow of light through such a light-pipe.

PRIOR ART

No prior art suggesting or describing the invention is known.

OBJECTS AND ADVANTAGES

It is a primary object of my invention to provide a convenient means and mechanism for allowing, modulating, pulsing and preventing the flow of light through a light-pipe.

It is a further object to provide convenient means for allowing light to flow through one light pipe and preventing light from flowing through a second light-pipe and for simultaneously and substantially instantaneously switching the light-flow conditions or states between the two light-pipes through the motion of an opaque platen or disc.

It is a further object to provide such a valve or switching mechanism which minimizes light losses during the flow state or condition by incorporating a light receiving and concentrating lens within the platen.

It is a further object to provide such a valve or switching mechanism which minimizes light losses during the flow state or condition by incorporating a light receiving and concentrating lens external the platen.

It is a further object to provide such a valve which is electrically operated and capable of state reversal by polarity reversal.

It is a further objective to provide means for slowly opening and closing the light flow means. It is a further object to provide a mechanism for partly opening or partly closing the light flow path, whereby the light flow is attenuated.

It is a further object to provide means for establishing a pulsing sequence within the light flow path and further to provide means for selecting or adjusting the pulse rate.

It is a further object to secure the above objects and advantages employing a motor as actuator.

It is a further object to provide the above objects and advantages within a hermetically sealed case having an internal platen and including an external motor magnetically connected to the platen.

Further objectives and advantages will be evident from the drawings and comments related thereto and from the associated text.

SUMMARY OF THE INVENTION

For a light pipe pair having a source portion having a source end and a sink portion having a sink end, a casing having means for receiving and coaxially positioning the two ends, the casing containing a rotatable platen having an opaque part and a transparent part, and means for allowing and preventing light transmission between the two ends by alternately positioning the transparent and the opaque part between the two ends.

BRIEF DESCRIPTION OF THE DRAWINGS

FIG. 1 displays the elements of the invention with a single light pipe pair and a rotating platen with the casing removed for clarity.

FIG. 2 illustrates the relative positioning of two light pipe pairs to demonstrate a normally-open/normally-closed function.

FIG. 3 shows a cross-section of a casing with means for coaxially positioning the ends of a light pipe pair in a functional relationship with the motor rotatable platen.

FIG. 3A is an enlargement of a portion of FIG. 3 provided to more clearly illustrate the positioning of a light gathering and concentrating lens in the platen and an alternate position adjacent the sink-end of the light pipe pair.

DETAILED DESCRIPTION OF THE INVENTION

Figure 4:
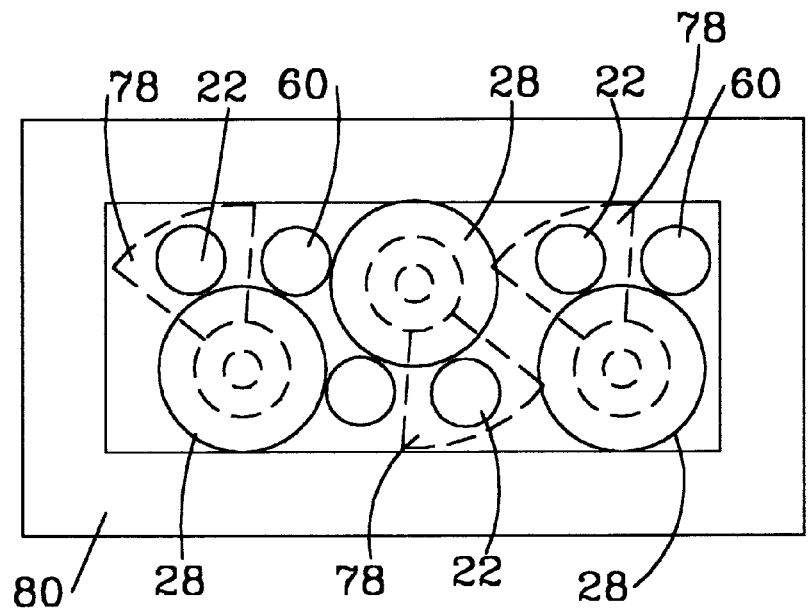
FIG. 4 shows a plan view of a casing adapted to receive three motor actuators and platens, each with a normally open (N/O) and a normally closed (N/C) position for a light pipe pair requiring that function.

In FIG. 1, light-pipe pair formed of light-pipe 20 having end 25, and light-pipe 22 having end 26, are displayed positioned coaxially, that is, having a common centerline C/L. Light-pipe 22 has light conducting core 24 and cut end 26. Light-pipe 20 has light conducting core 24 and cut end 25. Between end 25 and 26 is positioned opaque rotatable disc or platen 34 into which a V-shaped notch having edges 38 and 40 has been formed. The notch 38, 40 forms a transparent part of opaque platen 34. The transparent characteristic of the notch 38, 40 is just as much a part of the rotatable platen 34 as if it had been formed of a solid transparent material such as glass mounted within notch 38, 40. This is because its transparent characteristic moves with the notch, just as a glass window occupying that position would move.

When the opaque portion 34 of the platen is positioned between light-pipe faces 25 and 26, there can be no light transmission or light flow from one light pipe part of the pair to the other. While either part of the light-pipe pair could function as the light source and the other part of the pair as the receiving part or sink, for convenience the transmitting or source part will be designated 22 and the receiving or sink part as 20.

Platen 34 rotates on shaft 32. Shaft 32 may be turned or rotated by hand. However, in the preferred embodiment shaft 32 is connected to motor 28. Motor 28 is provided with electrical leads 30. In the preferred embodiment motor 28 is of the direct current reversible type. It rotates in one direction when a first motor lead is connected to the positive voltage and in the reverse direction when a first motor lead is connected to the negative voltage of the power supply. A typical motor employed in the application has a Mabachi nameplate and a model number 1MJ421A. The motor measures 1–3/16 inches long, 5/8 inch wide and ½ inch thick. It has an effective voltage range of 3.5 to 5.5 DCV and reverses on polarity change. It may be operated indefinitely in a stalled condition and draws about 0.75 amps at that condition.

A stop-pin 36 is provided to prevent the platen 34 from spinning, on the application of power to the motor leads 30. When motor 28 is energized to cause the platen to rotate in a direction that notch edge 38 contacts and is stopped by pin 36, the notch position allows light to flow from source light-pipe 22 to sink light-pipe 20. At that time the power may be removed from the motor leads 30 and the platen will remain in the light-transmitting position. On reversing the polarity of electrical power applied to motor leads 30, the motor 28 will cause shaft 32 to rotate in an opposite direction, thereby causing notch edge 40 to rotate toward and engage, and therefore be stopped by, stop pin 32, thereby positioning an opaque portion of platen 34 between the light pipe ends 25 and 26 and preventing light flow between them.

Spring means positioned inside the motor 28, and therefore not shown in the figures, are optionally provided to cause the shaft and the platen to rotate in the power-off condition to either a light transmitting or a non-transmitting condition. With the spring biasing the platen toward a light transmitting condition, a condition where notch edge 38 bears on stop pin 32, the valve becomes a normally-open type (NO). In that mode power must be applied to the leads 30 of motor 28 to cause the platen 34 to rotate in a direction that stops the light flow. In that NO mode, when the power is removed from the motor leads, the platen 34 rotates under spring action in a direction that causes notch edge 38 to contact stop pin 36, thereby rendering the valve open to light flow. In the NC mode the internal spring is simply biased to cause the platen to rotate toward a non-transmitting condition where notch edge 40 bears on stop pin 36. In that NC mode, power must be applied to motor leads 30 to cause the valve to open by rotating platen 34 until notch edge 38 bears against stop pin 36, thereby moving the transparent portion of platen 34 between the light-pipe faces 25 and 26 and allowing and allowing light to flow. When power is removed from the motor leads 30 in the NC mode, the platen rotates to bring notch edge 40 to bear against stop pin 36, thereby closing the light valve by positioning an opaque portion of platen 34 between lighy-pipe ends 25 and 26 and stopping light flow between the elements of the light-pipe pair 20, 22.

Referring now to FIG. 2, there is shown an end view of the structure displayed in FIG. 1, with the addition of a second light-pipe pair 20A, 22A. For clarity, only the light-pipe parts adjacent the motor 28 are shown. In this construction the stop pin 36 is positioned between the two light-pipe pairs. In this embodiment of the invention one light-pipe pair is always in the light conducting mode and the other light-pipe pair is in the non-conducting mode. For example, with the platen 34 rotated in direction A, notch edge 40 contacts and is stopped by stop pin 36. In that position light-pipe pair 22 (20, 22) is in the non-transmitting mode and light-pipe pair 22A (20A,22A) is in the light transmitting mode. When the platen is rotated in direction B, either by action of motor 28 or an internal spring, notch edge 38 is rotated into contact with stop pin 36 and the light-pipe pair 22A becomes non-transmitting and the light-pipe pair 22 becomes light transmitting. This arrangement is similar to a double pole-double throw (DPDT) electrical switch.

In FIG. 3 the mechanical elements of the invention are illustrated installed within an enclosure and support casing having motor side 44 and base side 46. Motor 28 is shown mounted in a cavity or well within casing side 44. However, the motor may be mounted in any convenient way. Platen 34 is centrally mounted on motor shaft 32 (see FIG. 1). Light pipe part 22 is secured in socket 21 on motor side of casing 44. Light-pipe part 20 is mounted in socket 23 in casing side 48. Sockets 21 and 23 are formed with a common axis so that the centerlines of light-pipe parts positioned in then are coaxial. While not shown, sockets for light-pipe pair 20A, 22A may also be provided. The two interior faces 48 and 49 of casing parts 44 and 46 are shown spaced apart a distance of 0.015 inches by spacer 36 which traverses the entire periphery of the casing parts. Selection of other spacer thicknesses would be a matter of engineering design. The casing is preferably fabricated by molding of a polymeric material. While the casing and light-pipe may be of any size, typically the light-pipes are 0.31 inches in diameter and platen 34 has an overall diameter of 1.25 inches and a thickness of 0.005 inches aluminum, though the material and thickness may be chosen to suit the exact needs of the application.

When light from source light-pipe part 22 is discharged or emitted from its face 26 there are both scattering and attenuation of the emitted light. In order to substantially restore the intensity of the light received by sink part 20 a lens 70 is provided. The lens 70 is firmly positioned within platen 34 and rotates with the platen exactly the same as the transparent notch it replaces. This may be observed most clearly in the enlarged portion 3A of FIG. 3. In an alternate embodiment, lens 71 is positioned in the portion of socket 23 adjacent light-pipe end 25. In this embodiment of the invention notch 38, 40 is retained and the difuse light emitted by light-pipe face 26 and transmitted through the notch, is gathered and concentrated by lens 71 for transmission into face 25 of sink light-pipe 20.

In FIG. 4 casing 80 supports three motors 28. Each motor is shaft-connected to a platen 78. A stop equivalent in function to pin 36 of FIG. 1 is provided, though not shown. Each platen provides light flow control over a light-pipe pair 22 (20, 22 of FIG. 1) An additional light-pipe pair 60 is shown in case the DPDT function of FIG. 2 is desired. Note that the platens 78 include an opaque portion having an angular width sufficient only to block light from a single light-pipe pair.

Figure 5:
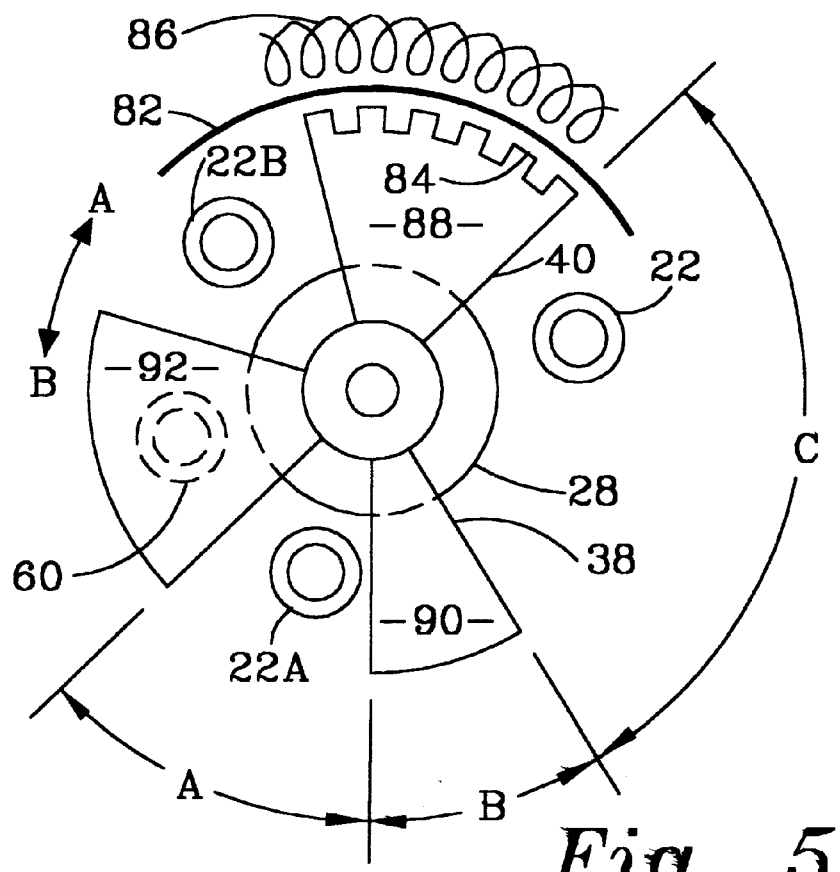
FIG. 5 displays a version of the invention having a platen with several opaque portions and several transparent portions occupying unequal angles for generating light pulses of the desired duration. Displayed also is an electrical synchronous-type motor winding positioned to actuate a square-toothed periphery of a platen portion, whereby a range of rotational speeds is securable.

FIG. 5 displays a plan view of a platen having three opaque parts 88, 90 and 92. Each opaque part has a different angular width from its neighbors and is separated from its neighbors by transparent notches having a variety of angular widths, A, B and C. Under the rotating influence of motor 28 or another rotational mover, each light-pipe pair, comprising here pairs 22, 22A, 22B and 60, is subjected to a flow/non-flow sequence which is dependent on the relative angular widths of the opaque and transparent portions. Note that stop pin 36 is omitted from this embodiment. The rotation of the platen therefore causes each light-pipe pair to transmit light in a pulsating pattern or sequence. The sequences can be established and adjusted simply by varying the angular width of the opaque and transparent portions and the inter-opaque angular relationships.

Opaque platen portion 88 is provided with a series of peripheral tabs 84 with rectangular outlines. These tabs may be provided on one or on all of the opaque portions 88, 90 and 92 of the platen. An electrical winding 86 is positioned radially adjacent the tabs 84. The winding 86 is intended to be actuated by an alternating current of fixed or variable frequency. A shading coil or other means for providing an initial starting torque is present but not shown. In this embodiment of the invention the platen is formed of an electromagnetic or electrically conductive material of a type that is well know to the designers of clock or other synchronous motors. A rudimentary casing, generally designated as 82 is shown positioned between the winding 86 and the platen 88. While the winding 86 is shown positioned outside the casing 82, in other embodiments of the invention winding 86 may be positioned within the casing. With the winding positioned outside the casing 82, the casing can be hermetically sealed against the entry of dirt or moisture by the expedient of replacing the gathering and concentrating lens 71 in FIG. 3A with a planar lens sealed into the inner end of light-pipe socket cavity 23.

From the foregoing description it can be seen that the present invention comprises an advanced system for allowing, preventing and modulating the flow of light within a light-pipe pair. It will be appreciated by those skilled in the related arts, that changes could be made to the manifestations of the invention described in the foregoing description without departing from the broad inventive concepts embodied therein. I intend, therefore, that the protection provided by this patent is not to be limited to the particular manifestations or embodiments of the inventions disclosed but to cover all modifications and equivalents thereof and equivalents of specific elements which are within the scope and spirit of the inventions as defined by the appended claims as interpreted by the above disclosure.

I claim:

1. A light valve for allowing and preventing light flow within a light pipe pair said valve having a rotatable platen, the platen including opaque and transparent parts, said valve including means for receiving and coaxially positioning a source end of a light pipe and a sink end of a light pipe, said light pipes comprising a first light-pipe pair, and means for alternately positioning the transparent and the opaque parts of the platen between the ends, whereby light is alternately allowed to flow from the source end to the sink end and is prevented from flowing.

2. A valve as recited in claim 1 where the valve includes casing means for supporting the platen and for positioning the light-pipe ends.

3. A valve as recited in claim 2 further providing means for rotating the platen.

4. A valve as recited in claim 3 where the rotating means is manual.

5. A valve as recited in claim 3 where the rotating means is electrical.

6. A valve as recited in claim 5 further providing that the electrical rotating means comprises casing mounted reversible motor means.

7. A valve as recited in claim 5 further providing that the platen has electromagnetic properties and the electrical rotating means comprises winding means adapted to be energized by an alternating current source, said source having a frequency, said winding means adapted and positioned for engaging and acting on the platen and causing the platen to rotate at a speed related to the frequency of the current source.

8. A valve as recited in claim 7 further providing that the periphery of the platen is formed with shapes designed and intended to coact with the winding means to produce the desired rotation.

9. A valve as recited in claim 7 further providing that the windings are outside the casing.

10. A valve as recited in claim 7 further providing that the windings are mounted and positioned within the casing.

11. A valve as recited in claim 6 further providing mechanical means for stopping the platen from further rotation with the transparent part aligned with the light pipe ends upon a first rotational direction, thereby allowing light flow from the source to the sink light-pipe ends, and for stopping the platen from further rotation with the opaque part aligned with the light-pipe ends on a reversed rotational direction, thereby preventing light flow from the source to the sink light-pipe ends.

12. A valve as recited in claim 11 further providing a second light-pipe pair having a source end and a sink end, said second pair being coaxially mounted within the casing and so positioned to prevent light flow within the second light-pipe pair while the platen is positioned to allow light flow within the first light-pipe pair, and to allow light flow within the second light-pipe pair when the platen is so positioned to prevent light flow within the first light-pipe pair.

13. A valve as recited in claim 7 further including electrical means for allowing rotation of the platen to stop upon a selected degree of partial opening or closing of the light path between the sink and the source light-pipe ends.

14. A valve as recited in claim 7 further providing that the platen is formed with a rotationally serial sequence of opaque and transparent portions for producing a repeating series of light transmitting and non-transmitting time periods.

15. A valve as recited in claim 14 further providing that the durations of the light transmitting periods allowed during a single platen rotation are equal.

16. A valve as recited in claim 15 further providing that the durations of the light transmitting periods allowed during a single platen rotation are unequal.

17. A valve as recited in claim 6 further providing a light gathering and concentrating lens positioned to receive light from the source light-pipe end, concentrate said light and project said light upon the sink end of the light-pipe pair.

18. A valve as recited in claim 17, further providing that the lens is positioned in the platen and rotates therewith.

19. A valve as recited in claim 17, further providing that the lens is positioned substantially adjacent the sink end of the light-pipe pair.

* * * * *